United States Patent
Wilkins et al.

(10) Patent No.: US 10,027,102 B2
(45) Date of Patent: Jul. 17, 2018

(54) MATERIAL AND ASSOCIATED ARRANGEMENTS, SYSTEMS AND METHODS

(71) Applicant: Carillion Utility Services Limited, Wolverhampton (GB)

(72) Inventors: Joanne Wilkins, Cheshire (GB); Alex Routledge, Greater Manchester (GB)

(73) Assignees: Carillion Utility Services Limited, Tyne and Wear (GB); MURPHY POWER NETWORKS LIMITED

( * ) Notice: Subject to any disclaimer, the term of this patent is extended or adjusted under 35 U.S.C. 154(b) by 0 days.

(21) Appl. No.: 14/916,916

(22) PCT Filed: Sep. 4, 2015

(86) PCT No.: PCT/GB2015/052572
§ 371 (c)(1),
(2) Date: Mar. 4, 2016

(87) PCT Pub. No.: WO2016/038345
PCT Pub. Date: Mar. 17, 2016

(65) Prior Publication Data
US 2017/0179705 A1    Jun. 22, 2017

(30) Foreign Application Priority Data

Sep. 10, 2014  (GB) .................................. 1415981.8
Mar. 6, 2015   (GB) .................................. 1503799.7

(51) Int. Cl.
*H02G 3/04* (2006.01)
*H02G 9/02* (2006.01)
(Continued)

(52) U.S. Cl.
CPC ............. *H02G 9/025* (2013.01); *H01B 7/423* (2013.01); *H02G 15/013* (2013.01)

(58) Field of Classification Search
CPC .......... H05K 9/0073; H05K 5/02; H02G 9/00; H02G 9/10; H02G 9/025; H02G 15/013;
(Continued)

(56) References Cited

U.S. PATENT DOCUMENTS 3,489,626 A * 1/1970 Rubenstein ............. B28B 21/14
                                                    156/162
3,532,132 A * 10/1970 Rubenstein ............. F16L 1/038
                                                    138/141
(Continued)

FOREIGN PATENT DOCUMENTS

DE   74 08 004 U      9/1974
JP   2006-096598 A    4/2006
WO   WO-99/64367 A1   12/1999

OTHER PUBLICATIONS

JP 2006096598 A English Translation; hereinafter Shiro.*
International Search Report and Written Opinion for Application No. PCT/GB2015/052572, dated Nov. 12, 2015.

*Primary Examiner* — Pete Lee
(74) *Attorney, Agent, or Firm* — Marshall, Gerstein & Borun LLP

(57) ABSTRACT

A cable surround material for a cable of an electricity transmission system comprising a mixture of: an additive containing carbon; sand; and cement, wherein the material comprises, by weight, approximately 60-80% carbon containing additive, approximately 5-10% cement, and a remainder of sand.

14 Claims, 1 Drawing Sheet

(51) Int. Cl.
*H02G 15/013* (2006.01)
*H01B 7/42* (2006.01)

(58) Field of Classification Search
CPC . H01H 9/02; H02B 1/50; H01B 17/30; H01B 17/305; H01B 7/423; H01G 4/224
See application file for complete search history.

(56) References Cited

U.S. PATENT DOCUMENTS

| | | | | |
|---|---|---|---|---|
| 5,298,068 | A * | 3/1994 | Giesemann | C04B 28/006 106/601 |
| 7,942,371 | B1 | 5/2011 | McCoy | |
| 2002/0018697 | A1* | 2/2002 | Vinegar | B09C 1/062 405/128.55 |
| 2004/0210289 | A1* | 10/2004 | Wang | A61K 9/5094 607/116 |
| 2007/0062415 | A1* | 3/2007 | Guevara | C04B 16/08 106/638 |
| 2012/0061380 | A1* | 3/2012 | Parsche | E21B 36/04 219/618 |

* cited by examiner

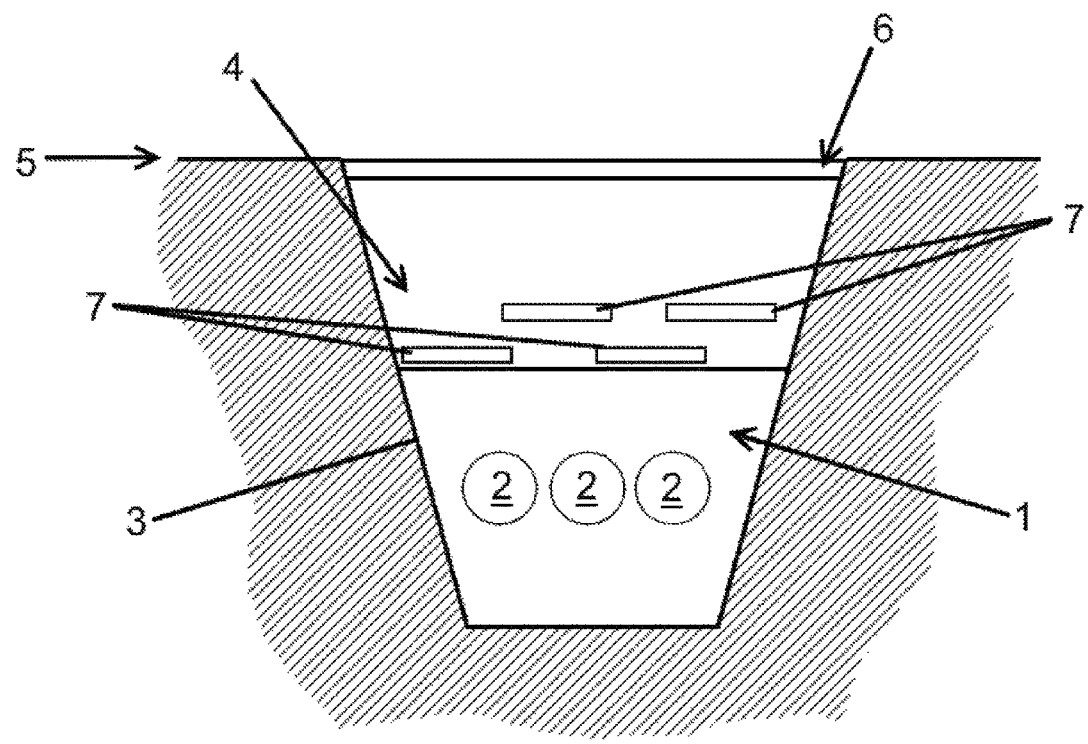

MATERIAL AND ASSOCIATED ARRANGEMENTS, SYSTEMS AND METHODS

FIELD OF TECHNOLOGY

Embodiments of the present invention relate to a cable surround material, methods of mixing a cable surround material, methods of laying cable using a cable surround material, and cable laid in a cable surround material.

BACKGROUND

Underground electrical transmission cables are becoming increasingly popular. Underground cabling may be used for aesthetic reasons but underground cabling may also used when there are certain space constraints, a high likelihood of severe weather conditions (such as very cold temperatures and/or high winds), issues with electromagnetic interference caused by overhead cabling, or a need to protect the security of the transmission system.

Such cabling may be high voltage electrical transmission cabling used in the transmission of high voltage electricity in an electricity transmission network.

As will be appreciated, the provision of electrical transmission cables underground brings with it many issues which are not encountered with overhead electrical transmission cables.

For example, overhead electrical transmission cables have a relatively large distance of air between the conductors of the cables attached to a pylon or other support structure. The air acts as an electrical insulator (so no separate insulation is necessarily required for many applications) and also as a mechanism of transmitting heat away from the cables.

Underground cables, however, need additional electrical insulation as they may be installed in damp ground material which is a relatively good conductor of electricity. The electrical insulation which is provided around underground cables also inhibits the transmission of heat away from the cables. Furthermore, the cables are not surrounded by air and so heat from the cables is, in any event, transmitted away from the underground cables more slowly.

The heat generated by underground electrical transmission cables is a serious issue which must be addressed in the designing of the underground cabling system. For example, the system design may call for specific cable spacings, and larger diameter cables that would otherwise be needed.

In order to allow for the design parameters to be determined, there is a need to determine the rate at which heat is conducted away from the cables so that the correct design can be determined. In order to provide a controlled rate of thermal conduction, the cables are generally surrounded by a material of known thermal conductivity/resistance properties. The material is generally known as a cable surround material may be formed from a mixture of sand and cement.

The conventional cable surround material provides a predetermined thermal conductivity (and hence a predetermined thermal resistivity or 'TR'). The higher the thermal resistivity of the cable surround material then the slower heat will be conducted from the cable into the surrounding ground and the larger the diameter of the cable must be—to reduce electrical resistance and hence the heat generated during use.

A lower thermal resistivity would allow cables with respective conductors of smaller cross-section to be used. This means less raw materials are needed for the cables, lower transportation costs and more straightforward cable laying.

SUMMARY

There is a need, therefore, to ameliorate one or more problems associated with the prior art.

Accordingly, a cable surround material for a cable of an electricity transmission system comprising a mixture of: an additive containing carbon; sand; and cement, wherein the material comprises, by weight, approximately 60-80% carbon containing additive, approximately 5-10% cement, and a remainder of sand.

Another aspect provides a method of mixing a cable surround material as above, the method comprising: providing the carbon containing additive; providing the cement; providing the sand; and mixing the carbon containing additive, sand, and cement to form the cable surround material.

Another aspect may provide a method of laying a cable comprising: at least partially surrounding a cable in a cable surround material as above.

Another aspect may provide a cable arrangement comprising: a cable at least partially surrounded by a cable surround material as above.

Another aspect provides an electricity transmission system comprising a cable arrangement as above.

Another aspect of the present invention provides a cable surround material for a cable of an electricity transmission system comprising a mixture of an additive including a carbon family element and cement.

The carbon family element may be carbon.

The material may comprise, by weight, 25%-90% carbon containing additive and at least 10% cement.

The material may comprise, by weight, 56%-90% carbon containing additive and at least 10% cement.

The mixture may further include sand.

The material may comprise, by weight, approximately 60-80% additive, approximately 5-10% cement, and a remainder of sand.

The material may comprise, by weight, approximately, 67% additive, approximately 7% cement, and approximately 26% sand.

The material may comprise, by weight, about 27% carbon containing additive material, about 7% cement, and about 66% sand.

The material may comprise, by weight, about 47% carbon containing additive material, about 7% cement, and about 46% sand.

The additive may comprise greater than approximately 90% by weight carbon.

The additive comprises about 96% by weight carbon.

The carbon family element may be silicon.

The silicon may be substantially pure silicon.

The silicon may be provided as silicon carbide.

The mixture may further include sand.

The material may comprise, by weight, approximately 25-80% silicon containing additive, approximately 5-10% cement, and a remainder of sand.

The material may comprise, by weight, approximately 60-80% silicon containing additive, approximately 5-10% cement, and a remainder of sand.

The material may comprise, by weight, approximately, 67% silicon containing additive, approximately 7% cement, and approximately 26% sand.

The material may comprise, by weight, about 27% silicon containing additive material, about 7% cement, and about 66% sand.

The material may comprise, by weight, about 47% silicon containing additive material, about 7% cement, and about 46% sand.

The cement may be Portland cement.

The additive may contains the carbon family element or a key ingredient or constituent in crystalline or amorphous form, or both.

The additive may contain the carbon family element or a key ingredient or constituent in a granular form of varying sizes.

Another aspect of the present invention provides, a method of mixing a cable surround material, comprising: providing an additive; providing cement; and mixing the carbon containing additive and cement in accordance with a predetermined recipe to form the cable surround material.

Another aspect provides a method of laying a cable comprising: at least partially surrounding a cable in the cable surround material.

The method may further comprise mixing the cable surround material.

The method may further comprise: providing the cable, wherein the cable is for transmitting high voltage electricity in an electricity transmission system.

Another aspect provides a cable arrangement comprising: a cable at least partially surrounded by a cable surround material.

The cable may be for transmitting high voltage electricity in an electricity transmission system.

Another aspect provides an electricity transmission system comprising a cable arrangement.

The electricity transmission system may further comprise at least one cable sealing end compound, and/or joint bay, and/or stop joint, and/or fluid cooling system.

BRIEF DESCRIPTION OF DRAWING

Embodiments of the present invention are described, by way of example only, with reference to the accompanying drawings, in which:

FIG. 1 shows a cross-section through a trench including cable surround material according to embodiments of the present invention.

DETAILED DESCRIPTION

Embodiments of the present invention relate to a cable surround material 1. The cable surround material 1 may be used to surround a cable 2 for the transmission of electricity.

The cable 2 may be suitable for high voltage electricity transmission. For example, the cable 2 may be suitable for transmitting electricity at a voltage of greater than 33 kV or greater than 50 kV. In some embodiments, the cable 2 may be suitable for transmission of electricity of 33 kV, 50 kV, 66 kV, 115 kV, 132 kV, 230 kV, 275 kV, 400 kV, or 500 kV. In some embodiments, the cable 2 may be configured to transmit electricity in any of the ranges 33-500 kV, 50-500 kV, 66-500 kV, 115-500 kV, 137-500 kV, 230-500 kV, 275-500 kV, and 400-500 kV, for example.

The cable 2 may be laid in the ground in accordance with a laying method to form part of an electricity transmission system.

The cable 2 may be laid in a number of different manners. Embodiments of the present invention are relevant, at least, to methods of cable laying in which the cable 2 is to be surrounded by a material intended to provide thermal conduction of heat away from the cable 2.

In some embodiments, the cable 2 may be laid by the digging of a trench 3. The trench 3 may be at least partially filled with cable surround material 1. The cable 2 may then be laid in the trench 3 at least partially supported by the cable surround material 1. In embodiments, the cable 2 is supported on a temporary support structure above a surface, in advance of the volume between the cable 2 and the surface being filled with cable surround material 1. The cable 2 may then be covered by cable surround material 1 (by depositing more cable surround material 1 in the trench 3).

The trench 3 may be at least partially filled with other backfill material 4 and protective slabs of material 7 (e.g. concrete) may be buried (e.g. in the other backfill material 4) between the cable 2 and the ground surface 5 to provide protection for the cable 2. The trench 3 may finally be covered at the ground surface by a suitable surface covering 6 (e.g. tarmac, asphalt concrete, turf or the like) if appropriate.

Such a method and arrangement is the direct laying of the cable 2 in the ground. As will be appreciated, such a method may be used for the laying of a plurality of such cables 2.

Other methods of cable 2 laying (and arrangements of laid cable 2) are also possible. For example, ducting may be used to carry one or more cables 2.

In some embodiments, one or more cables 2 may be laid in a surface trough which may take the form of a concrete trench in which the or each cable 2 is laid and surrounded by cable surround material 1. The surface trough may include a cap or cover which may comprise a concrete cap or cover.

As will be appreciated, for the transmission of electricity there will be a plurality of such cables 2 and there may even be a plurality of such cables 2 for each phase of electricity to be transmitted. A plurality of such cables 2 laid in the ground and forming part of the electricity transmission system, therefore, forms a cable arrangement.

The plurality of cables 2 may be laid in groups, with a first group of cables 2 being laid in close proximity to each other and a second group of cables 2 being laid a predetermined distance from the first group of cables 2 (that predetermined distance being greater than the distance between the individual cables forming the first or second group of cables 2 respectively). The cables 2 of the first and second groups of cables 2 could, for example, be laid in respective trenches (e.g. within a trench less than 2 m wide or 1.5 m wide). The first and second groups of cables 2 may also be laid with respect to a third group of cables 2 which is spaced from the first and second groups by a distance which is greater than the spacing of the first group with respect to the second group of cables 2.

The spacing of an arrangement of cables 2 may be at least partially determined by the thermal characteristics of the cables 2 and the cable surround material 1.

The cable 2 (or cables 2) may be laid as described above as an underground cable 2 (or as an arrangement of underground cables 2). However, the cable 2 (or cables 2) may also pass through one or more other features of the electricity transmission system. For example, the cable 2 (or cables 2) may pass through joint bays, stop joints, or other junctions. In such features, the cable 2 (or cables 2) may not be surrounded by cable surround material 1. The electricity transmission system may also comprise at least one cable sealing end compound in which the cable 2 is (or cables 2 are) brought above the ground and attached to some other part of the electricity transmission system (which may be an overhead transmission system).

The electricity transmission system may include one more other conduits which may be configured to carry fluid therethrough. Such conduits may be coupled to pumps and heat exchangers, for example, and configured as part of a cooling system for the cable 2 (or cables 2). The one or more other conduits may be laid in close proximity to the cable 2 (or cables 2) and may also be at least partially surrounded by the cable surround material 1.

As will be appreciated from the above discussion regarding the laying of cables, the cable 2 is at least partially surrounded by the cable surround material 1. In embodiments, a length of the cable 2 is substantially surrounded by the cable surround material 1.

The cable 2 may be surrounded by cable surround material 1 to a depth of about 1 m all around the cable 2. In some embodiments, the cable 2 is laid on about a depth of cable surround material of about 75 mm, with approximately 75 mm of cable surround material 1 either side of the cable 2 and around 1 m of the cable surround material about the cable 2.

The cable 2 may be any form of cable suitable for the transmission of electricity in an underground transmission system in which the cable 2 would conventionally be surrounded by cable surround material 1. In general terms, the cable 2 comprises at least one electrical conductor and at least one layer of electrically insulating material which substantially surrounds the at least one conductor. The electrically insulating material may extend along a length of the at least one conductor and electrically insulating the at least one conductor from the ground (when laid in a trench, for example).

The cable 2 may be a cross linked polyethylene extruded cable, or a fluid filled cable, or a paper polyethylene laminated cable, or a mass impregnated non-draining cable, or a gas insulated line cable—for example. The cable 2 may have a copper and/or aluminium conductor.

The cable surround material 1 is, according to embodiments, a dry mix material. In other words, the material may be a generally dry composite material of granular form. The cable surround material 1 may be laid in this dry form. In some embodiments, water may be added to the laid cable surround material 1.

The cable surround material 1 may be provided to a site at which it is required for use in the laying of cable 2 in a pre-mixed form. In other words, one or more containers of the cable surround material 1 may be provided to the site and may be used directly as the cable surround material 1—see above.

In other embodiments, constituent parts of the cable surround material 1 are supplied to the site at which the material 1 is required in an unmixed form. The constituent parts may be provided separately and in separate containers. The constituent parts of the cable surround material may, therefore, be mixed on-site in accordance with a predetermined recipe (see below) to provide the cable surround material 1.

In other embodiments, the cable surround material 1 is provided as a wet mix—in other words, as a wet composite material.

The cable surround material 1 may, in embodiments, comprise a mixture of sand, cement, and an additive material.

The additive material may be a material with a key ingredient or constituent. That key ingredient or constituent may be carbon or a carbon containing material. In some embodiments, the key ingredient or constituent may be silicon or a silicon containing material. In some embodiments, the key ingredient or constituent may be an element from Group 14 of the periodic table or a material containing an element from Group 14 of the periodic table (the so called "carbon family" elements).

In some embodiments in which the cable surround material is provided as an unmixed material, the additive material is supplied to the site in a mixed form—ready to be mixed with sand and cement in accordance with a predetermined recipe.

In some embodiments, the additive material is a material which is predominantly formed from an element from the carbon family (such as carbon or silicon) as the key ingredient or constituent. For example, the carbon family element may form 90% or greater (by weight) of the additive material, or 95% or greater (by weight) carbon family element. The additive material may be a material which is substantially a carbon family element (such as carbon or silicon) aside from unavoidable impurities.

The carbon family element may be crystalline or amorphous. For example, the carbon family element may be carbon which may be may be calcined petroleum coke, or fuel grade coke, or anode grade coke. The carbon may be graphitised calcined petroleum coke. The carbon may be calcined anthracite.

The carbon family element may be silicon. The silicon may be substantially pure silicon (aside from unavoidable impurities as mentioned above). The silicon may be provided as silicon carbide. The silicon carbide may be so called 'green' silicon carbide or so called 'black' silicon carbide. The silicon carbide may include iron as an impurity. The purity of the pure silicon may be about 95-99% (e.g. about 98-99%).

The silicon may be provided as silicon carbide (as discussed) with a purity of about 85-99% (e.g. 85%, 90%, or 98%). The particle size may be 18, 30, 40, or 200 mesh sizes (about 0.075-1.00 mm, or a mixture thereof).

The additive material (particularly in the case of a material with carbon as the key ingredient or constituent) may include impurities such as fluorine, nickel oxide, ferric oxide, calcium oxide, magnesium oxide, sodium oxide, phosphorus pentoxide, sulphate, vanadium oxide, cupris oxide, and lead oxide. The impurities may amount to less than about 10% (and, in some embodiments, less than 5% or less than 4%) of the additive material by weight.

The additive material (particularly in the case of a material with carbon as the key ingredient or constituent) may be alkaline and may have a pH of about 8.5.

The cement may be Portland cement or another hydraulic cement. The sand may be cable sand (to meet Grade F under BS 882 and/or that 95% of the sand (by weight) passes through a 5 mm sieve).

The additive material may be provided as a powder or as pellets. In some embodiments, the additive material comprises a mixture of different forms of carbon family element (or elements) which may be in a mixture of different granular sizes (or may be substantially the same granular size).

The additive material may be in the form of a fine powder or may be of a grade equivalent of medium to coarse sand.

An additive material which has silicon carbide as the key ingredient or constituent may be of a grade of any of F10 to F220, or a mixture thereof (e.g. F24, F36, F180). In some embodiments, an additive material which has silicon carbide as the key ingredient or constituent may have a grade of F46 to F360, or a mixture thereof. In some embodiments, an additive material which has silicon carbide as the key ingredient or constituent may have a grade of F240 to F1200, or a mixture thereof.

In embodiments, the predetermined recipe comprises a conventional cable surround material recipe (a mixture of sand and cement) in which the proportion of sand in the recipe has been reduced and the additive material included in the recipe. In some embodiments, a portion of the sand such a conventional recipe is replaced by a corresponding portion of the additive material (by weight).

In some embodiments, the cable surround material may comprise 56-90% additive material, and a remainder of sand and cement. In some embodiments, the sand is omitted from the cable surround material. In some embodiments, the cable surround material 1 comprises about 25-80% additive material by weight, and a remainder of sand and cement. In some embodiments, the cable surround material 1 comprises about 60-80% additive material by weight, and a remainder of sand and cement. In embodiments, the cable surround material 1 comprises, by weight, 25-80% (or 60-80%) additive material, about 5-10% cement (preferably about 7%), and a remainder of sand. In some embodiments, the cable surround material 1 comprises, by weight, about 67% additive material, about 7% cement, and about 26% sand. In some embodiments, the cable surround material 1 comprises, by weight, about 75% additive material, about 6% cement, and about 19% sand. In some embodiments, the cable surround material 1 comprises, by weight, about 66.67% additive material, about 6.67% cement, and about 26.67% sand. In some embodiments, the cable surround material 1 comprises, by weight, about 27% additive material (e.g. 26.67%), about 7% cement (e.g. 6.67%), and about 66% sand (e.g. 66.67%). In some embodiments, the cable surround material 1 comprises, by weight, about 47% additive material (e.g. 46.67%), about 7% cement (e.g. 6.67%), and about 46% sand (e.g. 46.67%).

In embodiments, the key ingredient or constituent is carbon and the cable surround material 1 comprises, by weight, about 67% additive material (e.g. about 66.67%), about 7% cement (e.g. about 6.67%), and about 26% sand (e.g. about 26.67%). In embodiments, the key ingredient or constituent is carbon and the cable surround material 1 comprises about 75% additive material, about 6% cement, and about 19% sand. In embodiments, the key ingredient or constituent is carbon and the cable surround material 1 comprises, by weight, about 27% additive material (e.g. about 26.67%), about 7% cement (e.g. about 6.67%), and about 66% sand (e.g. about 66.67%). In embodiments, the key ingredient or constituent is carbon and the cable surround material 1 comprises, by weight, about 47% additive material (e.g. about 46.67%), about 7% cement (e.g. about 6.67%), and about 46% sand (e.g. about 46.67%).

In embodiments, the key ingredient or constituent is silicon (which may be provided as substantially pure silicon or as silicon carbide) and the cable surround material 1 comprises about 67% additive material (e.g. about 66.67%), about 7% cement (e.g. about 6.67%), and about 26% sand (e.g. about 26.67%). In embodiments, the key ingredient or constituent is silicon and the cable surround material 1 comprises, by weight, about 27% additive material (e.g. about 26.67%), about 7% cement (e.g. about 6.67%), and about 66% sand (e.g. about 66.67%). In embodiments, the key ingredient or constituent is silicon and the cable surround material 1 comprises, by weight, about 47% additive material (e.g. about 46.67%), about 7% cement (e.g. about 6.67%), and about 46% sand (e.g. about 46.67%).

In embodiments, the optimum moisture content of the cable surround material is about 11% with a dry density of 1.4 Mg/m3. In some embodiments, the optimum moisture content is about 10-15% and with a dry density of about 1-2 Mg/m3 or 1-1.5 Mg/m3.

The cable surround material 1 of some embodiments may have a thermal resistivity of around 0.2-0.5 Km/W (preferably 0.2-0.45 Km/W).

A conventional cable surround material, as used in typical conditions, has been determined to have a thermal resistivity of about 1.2 or greater.

It has been found that a cable surround material with an additive material with carbon as a key ingredient or constituent may achieve a thermal resistivity of 0.35-0.45 Km/W (e.g. 0.40-0.43 Km/W). It has been found that a cable surround material with an additive material with silicon as a key ingredient or constituent (whether substantially pure silicon or silicon carbide) may achieve a better (i.e. lower) thermal resistivity which may be 0.2 Km/W for some embodiments.

A lower thermal resistivity means a higher thermal conductivity. If the heat generated by the cable 2 surrounded by the cable surround material 1 can be removed from the region around the cable 2 more quickly, then a cable 2 with a conductor of smaller cross-section can be used for the same current and voltage.

Embodiments of the present invention include the cable surround material 1, a method of mixing the cable surround material 1, a method of laying a cable 2 using the cable surround material 1, a cable arrangement including cable at least partially surrounded by the cable surround material, and an electricity transmission system including such a cable arrangement.

As will be appreciated, "sand" as used herein is a reference to a form of aggregate. As will also be appreciated, "cement" is an example of a bonding material which may be substituted in some embodiments for a different bonding material in similar or identical quantities to those described herein in relation to cement.

The cable surround material 1 may consist of the carbon containing additive and cement (aside from unavoidable impurities). The cable surround material 1 may consist of the carbon containing additive, sand, and cement (aside from unavoidable impurities). The carbon containing additive may consist of carbon (aside from unavoidable impurities).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A cable surround material for a cable of an electricity transmission system comprising a mixture of:
    an additive containing carbon;
    sand; and
    cement, wherein the material comprises, by weight, approximately 67% carbon containing additive, approximately 7% cement, and approximately 26% sand.

2. A cable surround material according to claim 1, wherein the carbon containing additive comprises greater than approximately 90% by weight carbon.

3. A cable surround material according to claim 2, wherein the carbon containing additive comprises about 96% by weight carbon.

4. A cable surround material according to claim 1, wherein the cement is Portland cement.

5. A cable surround material according to claim 1, wherein the additive contains the carbon family element or a key ingredient or constituent in crystalline or amorphous form, or both.

6. A cable surround material according to claim 1, wherein the additive contains the carbon family element or a key ingredient or constituent in a granular form of varying sizes.

7. A method of mixing a cable surround material comprising a mixture of an additive containing carbon, sand, and cement, wherein the material comprises, by weight, approximately 67% carbon containing additive, approximately 7% cement, and approximately 26% sand, the method comprising:
   providing the carbon containing additive;
   providing the cement;
   providing the sand; and
   mixing the carbon containing additive, sand, and cement to form the cable surround material.

8. A method of laying a cable comprising:
   at least partially surrounding a cable in a cable surround material comprising a mixture of:
   an additive containing carbon;
   sand; and
   cement,
   wherein the material comprises, by weight, approximately 67% carbon containing additive, approximately 7% cement, and approximately 26% sand.

9. A method according to claim 8 further comprising mixing the cable surround material by:
   providing the carbon containing additive;
   providing the cement;
   providing the sand; and
   mixing the carbon containing additive, sand, and cement to form the cable surround material.

10. A method according to claim 8, further comprising:
    providing the cable, wherein the cable is for transmitting high voltage electricity in an electricity transmission system.

11. A cable arrangement comprising:
    a cable at least partially surrounded by a cable surround material comprising a mixture of:
    an additive containing carbon;
    sand; and
    cement,
    wherein the material comprises, by weight, approximately 67% carbon containing additive, approximately 7% cement, and approximately 26% sand.

12. A cable arrangement according to claim 11, wherein the cable is for transmitting high voltage electricity in an electricity transmission system.

13. An electricity transmission system comprising:
    a cable arrangement comprising:
    a cable at least partially surrounded by a cable surround material comprising a mixture of:
    an additive containing carbon;
    sand; and
    cement,
    wherein the material comprises, by weight, approximately 67% carbon containing additive, approximately 7% cement, and approximately 26% sand.

14. An electricity transmission system according to claim 13, further comprising at least one cable sealing end compound, joint bay, stop joint, or fluid cooling system.

* * * * *